No. 775,937. Patented November 29, 1904.

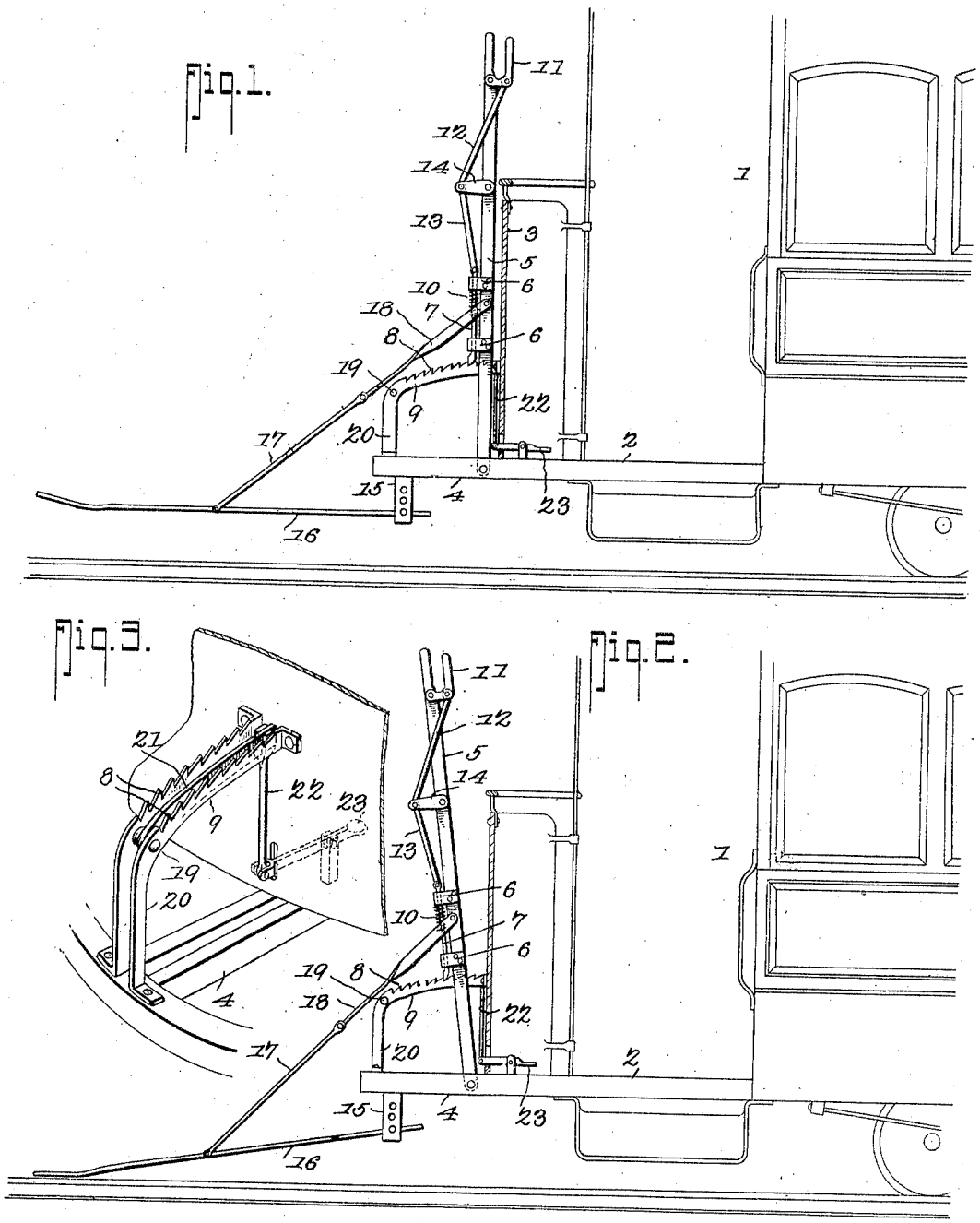

UNITED STATES PATENT OFFICE.

LUTHER RIDOUT, OF MEMPHIS, TENNESSEE.

CAR-FENDER.

SPECIFICATION forming part of Letters Patent No. 775,937, dated November 29, 1904.

Application filed July 21, 1904. Serial No. 217,510. (No model.)

*To all whom it may concern:*

Be it known that I, LUTHER RIDOUT, a citizen of the United States, residing at Memphis, in the county of Shelby and State of Tennessee, have invented a new and useful Car-Fender, of which the following is a specification.

This invention relates to car-fenders designed especially for use upon street-railway cars, and has for its objects to provide a comparatively simple inexpensive mechanism for manipulating the fender whereby the latter may be readily and quickly lowered for receiving a person or other obstruction upon the track and be lifted, together with its load, to an elevated position above the track and one wherein the movement of the fender to its lowered or receiving position will be automatic and its release effected by either hand or foot.

To these ends the invention comprises the novel features of construction and combination of parts more fully hereinafter described.

In the accompanying drawings, Figure 1 is a side elevation, partly in section, of the front portion of a car having my invention applied thereto and showing the fender in its normal inactive position. Fig. 2 is a similar view showing the fender in its active or receiving position. Fig. 3 is a detail perspective view of the foot-actuated tripping mechanism.

Referring to the drawings, 1 designates a car, 2 its end platform, 3 the dashboard, and 4 longitudinal beams or sills extending longitudinally beneath the car and projecting a suitable distance in advance of the dashboard, these parts being of the usual construction and material and connected in any appropriate manner. Pivoted at its lower end between a pair of the sills 4 and slightly in advance of the dashboard 3 is a normally vertical primary lever 5, having a pair of spaced bearings 6, which receive a vertically and longitudinally reciprocatory pawl 7, adapted for engagement with the teeth 8 of a rack 9, the pawl being normally pressed to engaging position by a spring 10. The pawl is positively released through the medium of a pivoted handpiece 11, sustained at the upper end of lever 5 and connected by links or rods 12 13 with the upper end of the pawl, while the inner or meeting ends of the links are pivoted to a supporting member or link 14, in turn pivoted to the lever 5, it being apparent from this arrangement that a straighter and more direct traction upon the pawl will be had through the intermediate links by the handpiece 11. Depending from the outer or forward ends of the sills 4 is a hanger 15, to the lower end of which the inner end of the fender 16 is pivoted, permitting of its outer or forward end being lowered into contact with or elevated a considerable distance above the railway tracks or rails. The primary portion or base of the fender has pivoted thereto at a point about midway between its ends an apron 17, which normally inclines upwardly and rearwardly and has attached to its upper edge one end of a connecting element or link 18, the other end of which is pivoted to the lever 5, whereby the latter may be manipulated for raising and lowering the forward end of the fender.

It will be observed that when the lever 5 is released by disengaging the pawl 7 from its rack the forward end of the fender 16 will drop by gravity onto the rails and that the lever 5 will accordingly be swung forward upon its fulcrum. Thus the fender will move automatically to position for receiving an obstruction from the rails and will come into such close proximity to the latter as to prevent the person or other body passing beneath the fender, and after the latter has received its load it may be readily raised to its normal elevated position through the medium of the lever 5, thereby lifting its forward end and its contents out of contact with the track.

The rack 9 is preferably of the form herein shown and comprises a pair of spaced side members or bars, the outer or forward ends of which are bent angularly downward to produce vertical posts or standards 20, attached at their lower ends to the timbers 4. The side bars bear upon their upper edges the teeth 8 and have disposed between them a supplemental bar or member 21, pivoted at its forward end upon an axle 19, extended between the posts 20, the upper edge of the bar 21 being free from teeth. The rear end of the bar 21, the upper edge of which normally lies below the plane of the teeth 8, is connected by a rod or other rigid element 22 with a suitably-pivoted normally horizontal foot-lever 23, arranged immediately over the platform 2 within convenient reach by the operator's foot.

In practice when the rear end of the lever 23 is depressed the rear end of the tripping bar or member 21 will be moved upward until its upper edge rises slightly above the outer ends of the teeth 8, thereby disengaging the pawl from the latter and releasing the lever 5 to permit movement of the fender to active position, as heretofore explained. Thus it is apparent that should the operator's hands be otherwise engaged to prevent the release of the fender this operation may be effected through the medium of the foot-lever, as just explained.

From the foregoing it is apparent that there is produced a device admirably adapted for the attainment of the ends in view, it being understood that minor changes may be resorted to without departing from the spirit of the invention.

Having thus described the invention, what is claimed is—

1. The combination with a car, of a depressible fender movably connected therewith, an operating-lever connected with the fender, means for locking the lever to maintain the fender in normal elevated position, and means for releasing the lever.

2. The combination with a car, of a fender movably connected therewith and adapted to swing downward toward the car-track, an operating-lever connected with the fender, means including a pawl and rack for locking the lever to maintain the fender normally in elevated position, and means for disengaging the pawl from the rack to release the fender.

3. The combination with a car, of a movable fender carried thereby, an operating-lever connected with the fender, means for locking the lever to maintain the fender normally in elevated position, and tripping mechanism for releasing the fender, the latter being adapted when released to move automatically toward the car-track to receiving position.

4. The combination with a car, of a movable fender carried thereby and adapted normally to stand in elevated position above the car-track and to move downward toward the latter to receiving position, means including a pawl and rack for locking the fender in normal position, and a movable member designed to act upon the pawl for releasing the same from the rack to release the fender.

In testimony that I claim the foregoing as my own I have hereto affixed my signature in the presence of two witnesses.

LUTHER RIDOUT.

Witnesses:
  J. W. Ross,
  W. Richmond.